US012790030B2

(12) United States Patent
McDonald et al.

(10) Patent No.: US 12,790,030 B2

(45) Date of Patent: Nov. 10, 2026

(54) QUANTITATIVE FLIGHT TEST DATA GATHERING

(71) Applicant: THE BOEING COMPANY, Arlington, VA (US)

(72) Inventors: Darren Gordon McDonald, Federal Way, WA (US); Roger Friedman, Duvall, WA (US); Ryan Louis Pettit, Snohomish, WA (US); Christopher Dennis Dallara, Seattle, WA (US); Alkhattab Hashim, Orange, CA (US); Christopher Caps, Eastsound, WA (US); Dulnath Daham Wijayratne, Brier, WA (US)

(73) Assignee: THE BOEING COMPANY, Arlington, VA (US)

( * ) Notice: Subject to any disclaimer, the term of this patent is extended or adjusted under 35 U.S.C. 154(b) by 59 days.

(21) Appl. No.: 18/965,290

(22) Filed: Dec. 2, 2024

(65) Prior Publication Data

US 2026/0152293 A1 Jun. 4, 2026

(51) Int. Cl.
*B64F 5/60* (2017.01)

(52) U.S. Cl.
CPC .................................... *B64F 5/60* (2017.01)

(58) Field of Classification Search
CPC ........................................................ B64F 5/60
See application file for complete search history.

(56) References Cited

U.S. PATENT DOCUMENTS

2012/0298806 A1 11/2012 Yamasaki
2014/0232568 A1 8/2014 Pennell et al.
2022/0219809 A1 7/2022 Cappelle et al.

OTHER PUBLICATIONS

Machine Translation of CN 201680011487 (Year: 2020).*
Romberger, Improving Safety: Understanding SUAS Autonomous Capabilities (Year: 2018).*
Fly-By-Wire, SKYbrary Aviation Safety, Retrieved Jul. 15, 2024, https://skybrary.aero/articles/fly-wire, pp. 1-10.
Niedermeier, Dominik et al., "Fly-By-Wire Augmented Manual Control—Basic Design Considerations," 28th International Congress of the Aeronautical Sciences, 2012, pp. 1-14.
Extended European Search Report for application No. 25218287.8 dated Mar. 27, 2026, pp. 1-10.

* cited by examiner

*Primary Examiner* — Alan D Hutchinson
(74) *Attorney, Agent, or Firm* — Moore IP Law

(57) ABSTRACT

A quantitative flight test data gathering system is configured to, during flight test operation of an aircraft, obtain, from one or more flight data sensors, from a flight control system, or both, one or more feedback signals indicative of a state of the aircraft. The quantitative flight test data gathering system is configured to generate, based at least in part on the feedback signals, one or more signals associated with a flight test maneuver. The quantitative flight test data gathering system is configured to provide the one or more signals as input to the flight control system to cause one or more control laws of the flight control system to generate control signals to cause the aircraft to operate according to the flight test maneuver.

20 Claims, 7 Drawing Sheets

QUANTITATIVE FLIGHT TEST DATA GATHERING

FIELD OF THE DISCLOSURE

The present disclosure is generally related to systems and methods to facilitate gathering of flight test data.

BACKGROUND

During flight testing, an aircraft can be flown in a manner that is atypical of normal flight operations. For example, some maneuvers flown during flight testing are intended to gather information about how the aircraft performs near boundaries of the flight envelope of the aircraft. Flight testing is used to gather both qualitative information and quantitative information.

Qualitative flight test data is typically provided by the pilots or other flight crew and includes information such as descriptions by the flight crew of how difficult it was to fly the aircraft under particular circumstances. For example, a pilot might describe whether an unusual amount of strength or physical endurance was needed to perform a particular maneuver. As another example, a pilot might describe whether performing the particular maneuver was technically difficult due to the precision control required or lack of feedback.

In contrast, quantitative flight test data includes measurements from sensors (typically onboard the aircraft). Some quantitative flight test data can be used to generate or update quantitative aircraft performance models. One challenge with quantitative aircraft performance modeling is gathering quantitative data for very unusual or extreme flight conditions. Flying flight test maneuvers to gather this data can be very difficult.

For example, aircraft with augmented fly-by-wire flight controls may automate certain functions that make specific and prescribed flight test maneuvers difficult to achieve with the augmentation and automation present. As a result, completing test maneuvers may require bypassing or disabling such flight control functions, even going so far as to bypass or disable most augmentation and/or automation. To highlight this distinction, operation of an aircraft with its full range of onboard augmentation and/or automation is referred to herein as Full Augmentation Mode, and operation of the aircraft with some of the aircraft's augmentation and/or automation capabilities bypassed or disabled, is referred to herein as Reduced Augmentation Mode.

Often gathering quantitative flight test data entails operation of the aircraft in a Reduced Augmentation Mode such that some active protection aspects of the flight control laws are disabled for the purposes of gathering test data. However, flying under such conditions is more difficult (e.g., higher workload which can reduce situational awareness, may require more piloting skill, and sometimes more physical strength and/or endurance). Pilots have human limits on things like strength, endurance, precision, and attention. Accordingly, there is a lower chance of successful execution of some maneuvers, and even if they are successfully flown, these maneuvers can impose significant physical burdens on the pilots flying them or reduce safety margin.

SUMMARY

According to one implementation of the present disclosure, an aircraft includes one or more flight data sensors, one or more control surfaces, one or more actuators coupled to the control surfaces, and a quantitative flight test data gathering system. The quantitative flight test data gathering system is communicatively coupled to a flight control system and to the flight data sensors. The quantitative flight test data gathering system is configured to, during flight test operation of the aircraft, obtain, from the one or more flight data sensors, the flight control system, or both, one or more feedback signals indicative of a state of the aircraft. The quantitative flight test data gathering system is also configured to generate, based at least in part on the feedback signals, one or more signals associated with a flight test maneuver. The quantitative flight test data gathering system is further configured to provide the one or more signals as input to the flight control system to cause one or more control laws of the flight control system to generate control signals for the one or more actuators to cause the aircraft to operate according to the flight test maneuver.

According to another implementation of the present disclosure, a method includes, during flight test operation of an aircraft, initiating a quantitative flight test data gathering system associated with a flight test maneuver. The method also includes obtaining, by one or more processors associated with the quantitative flight test data gathering system, one or more feedback signals from one or more flight data sensors of the aircraft, where the one or more feedback signals are indicative of a state of the aircraft. The method further includes generating, by one or more processors, one or more signals associated with the flight test maneuver. The method also includes providing the one or more signals as input to a flight control system of the aircraft to cause one or more control laws of the flight control system to generate control signals to cause the aircraft to operate according to the flight test maneuver.

According to another implementation of the present disclosure, a non-transitory computer-readable medium stores instructions that are executable by one or more processors to cause the processors to, during flight test operation of an aircraft, initiate a quantitative flight test data gathering system associated with a flight test maneuver. The instructions are further executable to cause the one or more processors to obtain one or more feedback signals from one or more flight data sensors of the aircraft, where the one or more feedback signals are indicative of a state of the aircraft. The instructions are also executable to cause the one or more processors to generate one or more signals associated with the flight test maneuver. The instructions are further executable to cause the one or more processors to provide the one or more signals as input to a flight control system of the aircraft to cause one or more control laws of the flight control system to generate control signals to cause the aircraft to operate according to the flight test maneuver.

The features, functions, and advantages described herein can be achieved independently in various implementations or may be combined in yet other implementations, further details of which can be found with reference to the following description and drawings.

DETAILED DESCRIPTION

Figure 1:
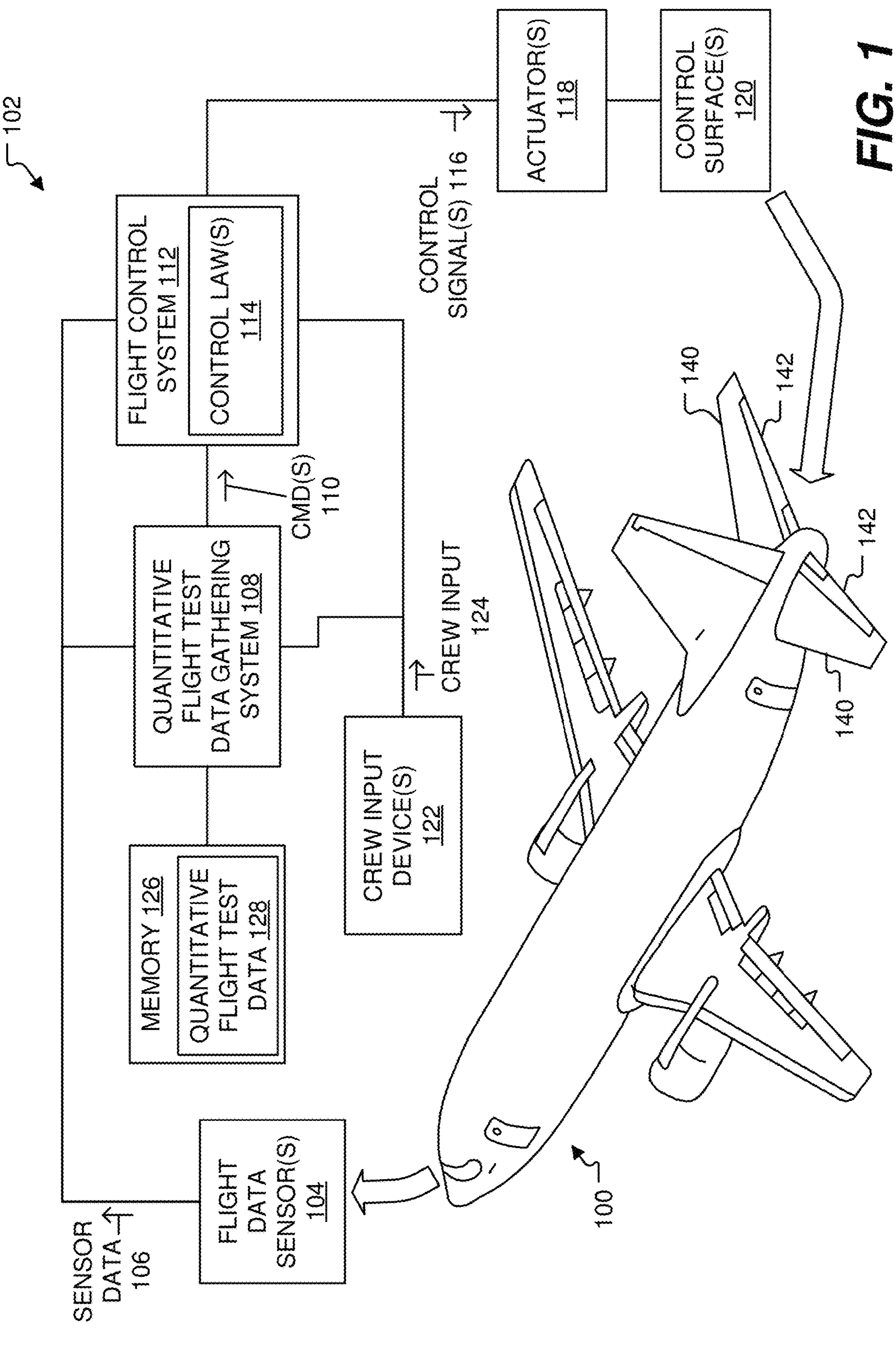
FIG. 1 is a diagram that illustrates an aircraft that includes a system for gathering flight test data.

As explained above, flight test maneuvers can be extremely difficult to perform, leading to test inefficiencies, reduced data quality, and increased risk. Flight control protections built into control laws can further increase the difficulty and inhibit certain maneuvers. Due to human limitations of the pilots, some flight test maneuvers have a low chance of successful execution, which may require multiple attempts, each of which can impose significant physical burdens on the pilots flying them.

Control laws do not have such precision, endurance or strength limits, but pilots are still needed to take over flying the airplane if the automation fails. And for some flight test maneuvers, it is important to have pilots in control to gather qualitative information. In such cases, automation may be used to provide assistance to the pilot, such as by providing envelope protections, tactile cues, or maneuver guidance.

An example of a flight test maneuver that is used to collect quantitative aerodynamic data for simulation modeling is called a stab-elevator trade (SET) maneuver. The SET maneuver involves jackknifing (e.g., pitching one control surface up and the other down) the horizontal stabilizers and elevators. Note, for ease of reference herein, the "horizontal stabilizer" may also be referred to simply as the "stabilizer." During Full Automation Mode operation of the flight control computer on some fly-by-wire aircraft, the pilot does not have direct control over the horizontal stabilizer in-air. Accordingly, for a pilot to fly a SET maneuver, flight controls are either modified or switched to a Reduced Automation Mode. The Reduced Automation Mode is a degraded airplane state, in which many or all of the Full Automation Mode control laws of the flight control computer are bypassed, resulting in loss of the protection features provided by the control laws. Generally, in the Reduced Automation Mode, alternative control laws are used. Such alternative control laws are generally simpler and more robust than Full Automation Mode control laws, and as a result, the alternative control laws incorporate fewer protective features and augmentations. Alternatively, the control law mode may be modified to remove specific protections or functions to achieve the control state needed to conduct the test maneuver. An aircraft operating in a modified control law mode or Reduced Automation Mode may therefore have different handling qualities than would be present in Full Automation Mode.

Further, executing the SET maneuver can be arduous on pilots. For example, during the SET maneuver, jackknifing is performed in both directions in small steps of deflection. In either direction, as the horizontal stabilizer is moved further away from its nominal trim position via trim switches, the elevator is also deflected to maintain an overall zero pitching moment on the airplane to continue flying straight-and-level. The elevator deflection is controlled by the pilot using the column. The total duration of the SET maneuver can be several minutes, subjecting pilots to significant column forces for extended periods of time, which is very fatiguing.

Other examples of quantitative flight test maneuvers include Flight Loads Survey (FLS) maneuvers to gather load data. One example of a FLS maneuver is a normal load factor (Nz) Pull-Up and Push-Over Maneuver. The Nz Pull-Up and Push-Over Maneuver is performed by sweeping the aircraft Nz between a lower target and an upper target. During the Nz sweep, the aircraft remains within speed and altitude tolerances and Nz limits. Exceeding Nz limits may require termination of flight testing until the aircraft can be inspected.

The Nz Pull-Up and Push-Over Maneuver can be described in three phases including a setup phase, a sweep phase, and a recovery phase. The sweep phase includes a Pull-Up maneuver and a Push-Over maneuver. During the Pull-Up maneuver, the aircraft is pitched upwards, increasing the positive Nz as the wings generate more lift to overcome gravity, gathering positive external load data. In the Push-Over maneuver, the aircraft is pitched downwards, reducing the Nz or creating negative Nz as the lift decreases relative to the aircraft's weight, gathering negative external load data. These maneuvers gather structural load data as part of the process to validate the external loads model of the aircraft.

Much of the time is spent in the setting up and recovery phases, while the sweep phase takes only five (5) or so seconds. When flown by a pilot, the Nz Pull-Up and Push-Over Maneuver is basically performed open-loop, as there is not enough time for the pilot to receive feedback from the airplane response and make corrections. Furthermore, corrections often reduce data quality to an unacceptable level, as a constant rate of change in Nz is highly desired during the Nz sweep. Accordingly, these maneuvers are practiced extensively in simulations on the ground, and then pilots generally make additional adjustments on the actual flight test airplane to account for different test conditions, inaccurate modeling, and other aerodynamic and atmospheric uncertainties. This is a time-consuming and inefficient process that often takes multiple attempts, sometimes over multiple flight test days.

The present disclosure includes a quantitative flight test data gathering system configured to address these concerns, as well as similar concerns for this type of maneuver or other maneuvers as well. The quantitative flight test data gathering system is configured to operate in conjunction with the one or more control laws in a closed loop manner to dynamically modify one or more states of the aircraft to generate quantitative flight test data over a range of states. The quantitative flight test data gathering system is communicatively coupled to the flight control system. The quantitative flight test data gathering system provides input to the control laws (in a Full Automation Mode) to enable execution of quantitative flight test maneuvers (such as, but not limited to the SET maneuver and the FLS maneuvers described in detail herein). This eliminates the undesirable characteristics of performing the qualitative flight test maneuvers in alternate or degraded control law modes, such as the Reduced Automation Mode, and reduces pilot workload. Additionally, the quantitative flight test data gathering system can enable more reliable quantitative flight test data to be gathered and can reduce the time used for flight testing.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 102 including one or more actuators ("actuator(s)" 118 in FIG. 1), which indicates that in some implementations the system 102 includes a single actuator 118 and in other implementations the system 102 includes multiple actuators 118. For ease of reference herein, such features are generally introduced as "one or more" features and may be subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates an aircraft 100 that includes a system 102 for gathering flight test data. The system 102 includes a quantitative flight test data gathering system 108 communicatively coupled to a flight control system 112 and to one or more flight data sensors 104. The aircraft 100 also includes one or more crew input devices 122 and one or more actuators 118 communicatively coupled to the flight control system 112. Each of the actuator(s) 118 is also coupled to one or more control surface(s) 120 of the aircraft 100. Specific examples of the control surface(s) 120 highlighted in FIG. 1 include the horizontal stabilizers 140 and the elevators 142.

In some implementations, the quantitative flight test data gathering system 108 can include or be integrated within one or more line-replaceable units (LRUs). In some implementations, the quantitative flight test data gathering system 108 includes instructions that are executable by one or more processors. In such implementations, the quantitative flight test data gathering system 108 can be integrated into the same LRU(s) as at least a portion of the flight control system 112. In other implementations, the quantitative flight test data gathering system 108 and the flight control system 112 are integrated within distinct LRUs.

The flight control system 112 and some or all of the flight data sensor(s) 104 can be included among normal operational equipment of the aircraft 100. For example, after flight testing is completed, the flight control system 112 and some or all of the flight data sensor(s) 104 can remain with the aircraft 100; whereas the quantitative flight test data gathering system 108 can be removed from the aircraft 100 or otherwise deactivated.

In a particular aspect, the aircraft 100 has a fly-by-wire configuration. In a fly-by-wire configuration, crew input 124 received via the crew input device(s) 122 is provided as one or more signals to the flight control system 112. The flight control system 112 includes one or more control laws 114 that use the crew input 124 and sensor data 106 from some or all of the flight data sensor(s) 104 to manipulate the control surface(s) 120. Thus, in a Full Automation Mode of operation of the flight control system 112, the pilot or other crew members (e.g., flight test crew) generally do not directly manipulate positions of the control surface(s) 120. Rather, the flight control system 112 generates one or more control signals 116, based on the crew input 124 and other information (e.g., a state of the aircraft 100 represented by the sensor data 106), that are provided to the actuator(s) 118 to move the control surface(s) 120. One or more signals(s) 110 can be communicated as analog or discrete signals. Discrete signals can include digital signals or pulse-width modulated signals. Likewise, the control signal(s) 116 can include analog or discrete signals. The fly-by-wire configuration reduces the pilot workload, enables enforcement of safety limits, and facilitates improved aircraft handling qualities, as compared to configurations in which the pilot more directly manipulates positions of the control surface(s) 120.

The quantitative flight test data gathering system 108 is configured to facilitate gathering of quantitative flight test data 128 while the flight control system 112 is operated in a Full Automation Mode or a Reduced Automation Mode (e.g., using alternate control laws). For example, during flight test operation of the aircraft 100, the quantitative flight test data gathering system 108 obtains one or more feedback signals indicative of a state of the aircraft 100. In some examples, some of the feedback signals provided to the quantitative flight test data gathering system 108 are also provided to the flight control system 112. The feedback signal(s) can include, for example, at least a portion of the sensor data 106 from the flight data sensor(s) 104, feedback signal(s) from the flight control system 112, or both. The quantitative flight test data gathering system 108 is configured to generate the one or more signals 110 associated with a flight test maneuver. The signal(s) 110 are based, at least in part, on the feedback signals. For example, the signal(s) 110 can be based on current positions of the control surface(s) 120, air data, internal data, control signals (e.g., one or more of the control signals 116) output by the flight control system 112, etc.

The quantitative flight test data gathering system 108 is configured to provide the signal(s) 110 as input to the flight control system 112. Responsive to the signal(s) 110, the one or more control laws 114 of the flight control system 112 generate control signal(s) 116 for the one or more actuator(s) 118 to cause the aircraft 100 to operate according to the flight test maneuver. For example, as described in more detail below, the signal(s) 110 can cause the control law(s) 114 to generate control signal(s) 116 to perform a SET maneuver or an FLS Maneuver.

In some implementations, the quantitative flight test data gathering system 108 is configured to gather at least a portion of the quantitative flight test data 128 during execution of the flight test maneuver. For example, the quantitative flight test data gathering system 108 can store at least a portion of the sensor data 106 at a memory 126 as the quantitative flight test data 128.

In some implementations, the quantitative flight test data gathering system 108 is also configured to initiate a recovery phase of the flight test maneuver responsive to detection of a flight test endpoint condition. For example, the quantitative flight test data gathering system 108 can be configured to detect the flight test endpoint condition responsive to receipt of sensor data 106 associated with a test goal. The test goal can include a particular aircraft state, duration of the flight test maneuver, or other factors. As another example, the quantitative flight test data gathering system 108 can be configured to detect the flight test endpoint condition responsive to receipt of sensor data 106 associated with a safety limit. To illustrate, the safety limit can include, or correspond to, a limit imposed by the control law(s) 114 or the quantitative flight test data gathering system 108. Examples of safety limits include altitude limits, speed limits, acceleration limits, attitude limits, etc.

As another example, the quantitative flight test data gathering system 108 can be configured to detect the flight test endpoint condition responsive to receipt of sensor data 106 associated with an aircraft system fault. To illustrate, the flight test endpoint condition can be satisfied if the sensor data 106 includes an indication of an engine fault, an actuator fault, a sensor fault, or a fault associated with another system of the aircraft 100.

In some embodiments, the quantitative flight test data gathering system 108 can be configured to detect the flight test endpoint condition responsive to receipt of crew input 124 via one of the crew input device(s) 122 during execution of the flight test maneuver. For example, a crew member (e.g., a pilot) can initiate the flight test maneuver via crew input 124, and thereafter, the system 102 can execute the flight test maneuver automatically. In this example, receipt of additional crew input 124 is taken as an indication to discontinue the flight test maneuver. As another example, the quantitative flight test data gathering system 108 can be configured to detect the flight test endpoint condition responsive to receipt of crew input 124 via a particular one of the crew input device(s) 122, but not other ones of the crew input device(s) 122. To illustrate, crew input 124 received via a column of the aircraft 100 may terminate execution of the flight test maneuver.

Thus, the quantitative flight test data gathering system 108 enables automated (or semi-automated) execution of various flight test maneuvers. Further, the quantitative flight test data gathering system is integrated with the normal flight control system 112 of the aircraft 100, which enables application of the control law(s) 114 in a Full Automation Mode, or a Reduced Automation Mode (e.g., a degraded mode or using modified control laws) during execution of the flight test maneuver. Automating aspects of the flight test maneuvers using the control law(s) 114 protects the aircraft 100 (by allowing the control law(s) 114 to enforce safety limits) and reduces pilot workload. Additionally, the quantitative flight test data gathering system 108 can generally execute difficult flight test maneuvers more precisely than a pilot can, which can result in more reliable quantitative flight test data 128 and can reduce the time and number of flights required to generate the quantitative flight test data 128.

Figure 2:
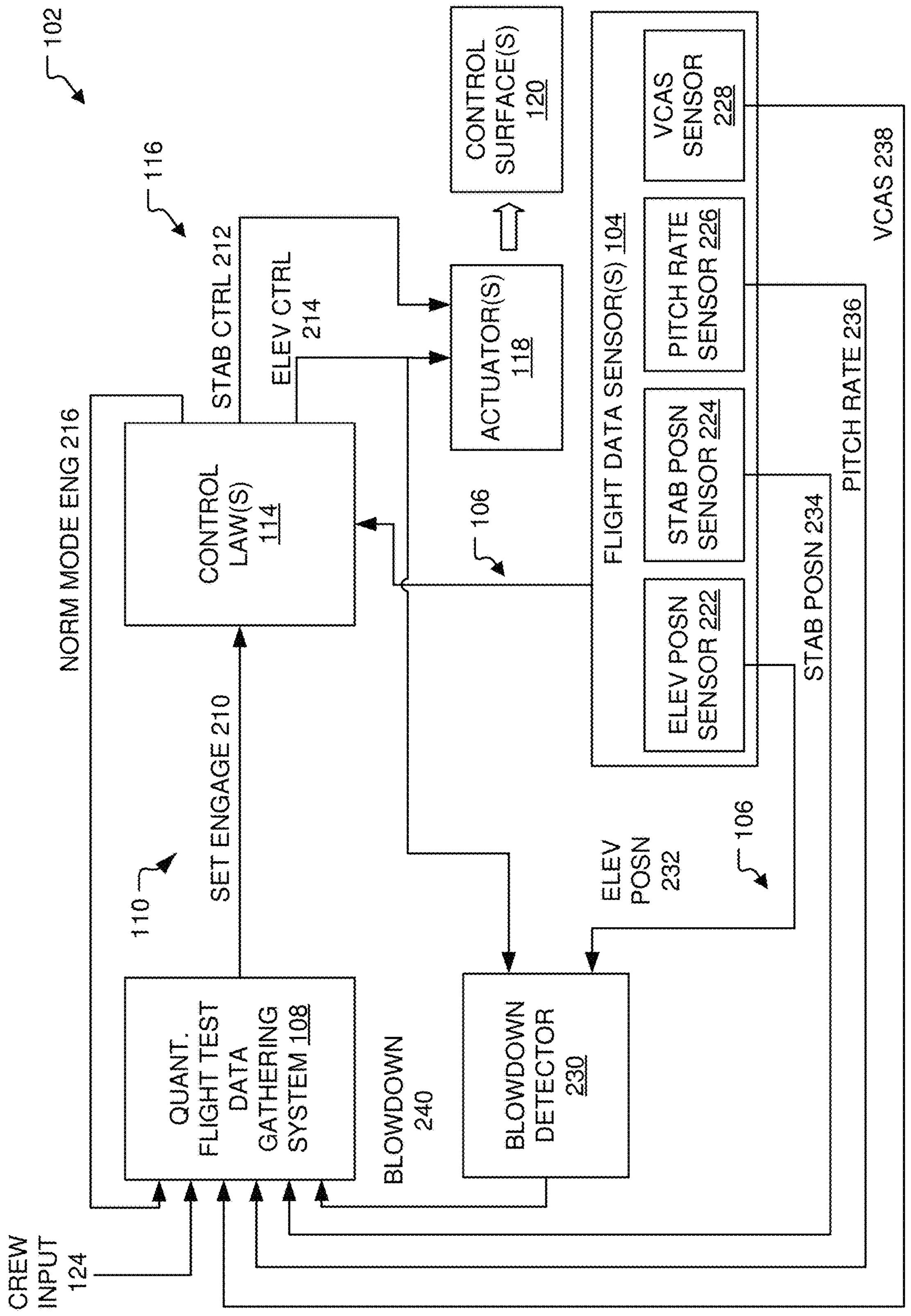
FIG. 2 is a diagram of a particular example of the system for gathering flight test data of FIG. 1.

FIG. 2 illustrates an example of the system 102 of FIG. 1. In the particular example illustrated in FIG. 2, the system 102 includes the quantitative flight test data gathering system 108, the control laws 114, the actuators 118, the control surfaces 120, and the flight data sensors 104 described with reference to FIG. 1. Other features or components of the aircraft 100 of FIG. 1 may also be present; however, such features or components are omitted from FIG. 2 merely to highlight certain aspects of the system 102 in a particular example.

In the example of FIG. 2, the system 102 is configured to gather quantitative flight test data (e.g., the quantitative flight test data 128 of FIG. 1) during execution of a SET maneuver. In this example, the quantitative flight test data gathering system 108 is configured to initiate or control performance of at least portions of the SET maneuver based on feedback signals (e.g., from the flight data sensors 104) that are indicative of speed of the aircraft, a pitch rate of the aircraft, other aircraft conditions, or combinations thereof. For example, in FIG. 2, the flight data sensors 104 include at least an elevator position sensor 222 ("ELEV POSN SENSOR"), a horizontal stabilizer position sensor 224 ("STAB POSN SENSOR"), a pitch rate sensor 226, and a calibrated airspeed sensor 228 ("VCAS SENSOR"). Thus, the sensor data 106 includes elevator position 232 ("ELEV POSN"), horizontal stabilizer position 234 ("STAB POSN"), a pitch rate 236, and calibrated airspeed 238 ("VCAS").

Further, in the example of FIG. 2, the control law(s) 114 are configured to generate control signals 116 that include at least a horizontal stabilizer control signal 212 ("STAB CTRL") and an elevator control signal 214 ("ELEV CTRL"). The horizontal stabilizer control signal 212 is provided to the actuator(s) 118 to cause the actuator(s) 118 to move the horizontal stabilizers 140 of the aircraft 100. Similarly, the elevator control signal 214 is provided to the actuator(s) 118 to cause the actuator(s) 118 to move the elevators 142 of the aircraft 100.

In some implementations, the control law(s) 114 may also be configured to generate a normal mode (e.g., Full Automation Mode) engage signal 216 ("NORM MODE ENG"). In such implementations, the normal mode engage signal 216 can be provided to the quantitative flight test data gathering system 108 to disengage the quantitative flight test data gathering system 108. For example, the control law(s) 114 can provide the normal mode engage signal 216 to the quantitative flight test data gathering system 108 in response to detection of a fault condition or a safety limit. When the quantitative flight test data gathering system 108 is disengaged, control of the aircraft 100 is returned to the pilot or to an automated flight system (e.g., an autopilot system).

In the particular example illustrated, the quantitative flight test data gathering system 108 is configured to provide signals 110 to the control laws 114 to initiate and/or control execution of the SET maneuver. For example, if the SET maneuver is entirely automated, the signals 110 can include a SET engage command 210. Additionally, or alternatively, the signals 110 can include specific horizontal stabilizer position commands.

The quantitative flight test data gathering system 108, or Control Law(s) 114, can disengage (e.g., issue a SET disengage command as one of the signal(s) 110) in response to receipt of the normal mode engage signal 216, in response to receipt of the crew input 124, or in response to detection of a flight test endpoint condition. In the case of a SET maneuver, one example of a flight test endpoint condition would be detection of a blowdown condition by a blowdown detector 230. Blowdown refers to a condition in which deflection of one or both elevators 142 has reached the point where the actuator hinge moment capability cannot overcome any additional increases in airload. In other words, the elevators 142 cannot effectively deflect further and the aircraft 100 has reached a limit of control authority in that direction. The blowdown detector 230 can generate a blowdown condition signal 240 that indicates the detected blowdown condition, or a predetermined threshold beyond which blowdown becomes likely, is detected. In the example illustrated in FIG. 2, the blowdown detector 230 can compare the elevator position 232 and the commanded elevator position as indicated by the elevator control signal 214. In a particular aspect, the blowdown detector 230 can detect the blowdown condition by comparing the elevator position 232 (e.g., a measured position of the elevators 142) and an elevator control signal 214 (e.g., a commanded position of the elevators 142). For example, the blowdown detector 230 can determine an error between the elevator position 232 and the elevator control signal 214. The error can be high-pass filtered to ignore any persistent, low-frequency biases that may exist in the error signal and to highlight any high-frequency spikes in error, which can indicate onset of blowdown.

Another example of a flight test endpoint condition for a SET maneuver would be detection that the horizontal stabilizer position 234 indicates that a position of the horizontal stabilizer satisfies a stabilizer limit or a stabilizer position target. For example, the SET maneuver may be terminated (and a recovery phase initiated) when the horizontal stabilizer position reaches a movement limit or a flight test target, either of which can be reached, in some instances, before a blowdown condition is reached.

Before execution of a SET maneuver, the horizontal stabilizers 140 and the elevators 142 may start out oriented at respective trim positions. To initiate the SET maneuver, the quantitative flight test data gathering system 108 sends the SET engage command 210. In response to the SET engage command 210 (and possibly additional signal(s) 110 from the quantitative flight test data gathering system 108), the control law(s) 114, operating in Full Automation Mode, send the horizontal stabilizer control signals 212 to the actuator(s) 118 associated with the horizontal stabilizers 140. The horizontal stabilizer control signals 212 cause the horizontal stabilizers 140 to move in a first direction away from a trim position. Additionally, the control law(s) 114 generate elevator control signals 214 to cause the elevators 142 to move in a second direction opposite the first direction (e.g., to reject any pitch disturbance due to movement of the horizontal stabilizers 140). For example, if the horizontal stabilizers 140 move to a positive angle relative to a reference position, the elevators 142 move to a negative angle relative to the reference position. Generally, the elevators 142 move by an amount sufficient to offset effects on pitch angle of the aircraft 100 due to the change of position of the horizontal stabilizers 140. That is, the elevator movement maintains straight-and-level, 1-g flight of the aircraft 100 despite movement of the horizontal stabilizers 140.

The SET maneuver proceeds by incremental movements of the horizontal stabilizers 140 and the elevators 142 in their respective directions. The amount of stabilizer angular offset with each incremental step can be relatively large at the beginning of the SET maneuver and can subsequently be decreased as the horizontal stabilizers 140 and elevators 142 approach a blowdown condition, or after a predetermined threshold beyond which blowdown becomes likely.

The SET maneuver proceeds until a flight test endpoint condition is detected. As noted above, the flight test endpoint condition can include a fault condition or a safety limit, which are conditions independent of the specific flight test maneuver being executed. However, ideally, the SET maneuver proceeds until a flight test endpoint condition associated with the SET maneuver is detected. Typically, a flight test endpoint condition for a SET maneuver is a detection that a blowdown condition has been reached.

After the elevator 142 reaches a blowdown condition due to movement of the horizontal stabilizers 140 in the first direction and the elevators 142 in the second direction opposite the first direction, the SET maneuver can be repeated with movement of the horizontal stabilizers 140 in the second direction and the elevators 142 in the first direction. Again, the horizontal stabilizers 140 and the elevators 142 are moved incrementally, and the amount of movement with each increment can be decreased as a blowdown condition is approached (or after some threshold is reached). The SET maneuver again continues until a flight test endpoint condition is detected.

After a flight test endpoint condition is detected, the quantitative flight test data gathering system 108 or the flight control system 112 can initiate a recovery phase to return the aircraft 100 to normal operation (e.g., in the case of a SET maneuver, to trim positions of the horizontal stabilizers 140 and the elevators 142 prior to execution of the SET maneuver). For example, the quantitative flight test data gathering system 108 can command movement of the horizontal stabilizers 140 toward their trim position. In this example, the control law(s) 114 cause the elevators 142 to move to maintain straight-and-level, 1-g flight despite movement of the horizontal stabilizers 140. Control of the aircraft 100 can then be returned to the pilot or flight automation system.

By using the quantitative flight test data gathering system 108, various challenges with performing the SET maneuver under manual control in a Reduced Automation Mode can be alleviated. For example, as the blowdown condition is approached, a pilot manually controlling the elevators 142 in Reduced Automation Mode could be holding upwards of 100 pounds of column force. This large force may need to be sustained and even increased over a relatively large period (e.g., two minutes or more) to safely approach the blowdown condition. If the column were to be released during execution of the SET maneuver (e.g., if the pilot's hands slip due to sweat or fatigue), the aircraft 100 could undergo a substantial upset. This challenge of manually flying the SET maneuver is avoided by use of the quantitative flight test data gathering system 108. In addition, by gathering quantitative flight test data 128 in Full Automation Mode, safety limits imposed by the control law(s) 114 are maintained.

Figure 3:
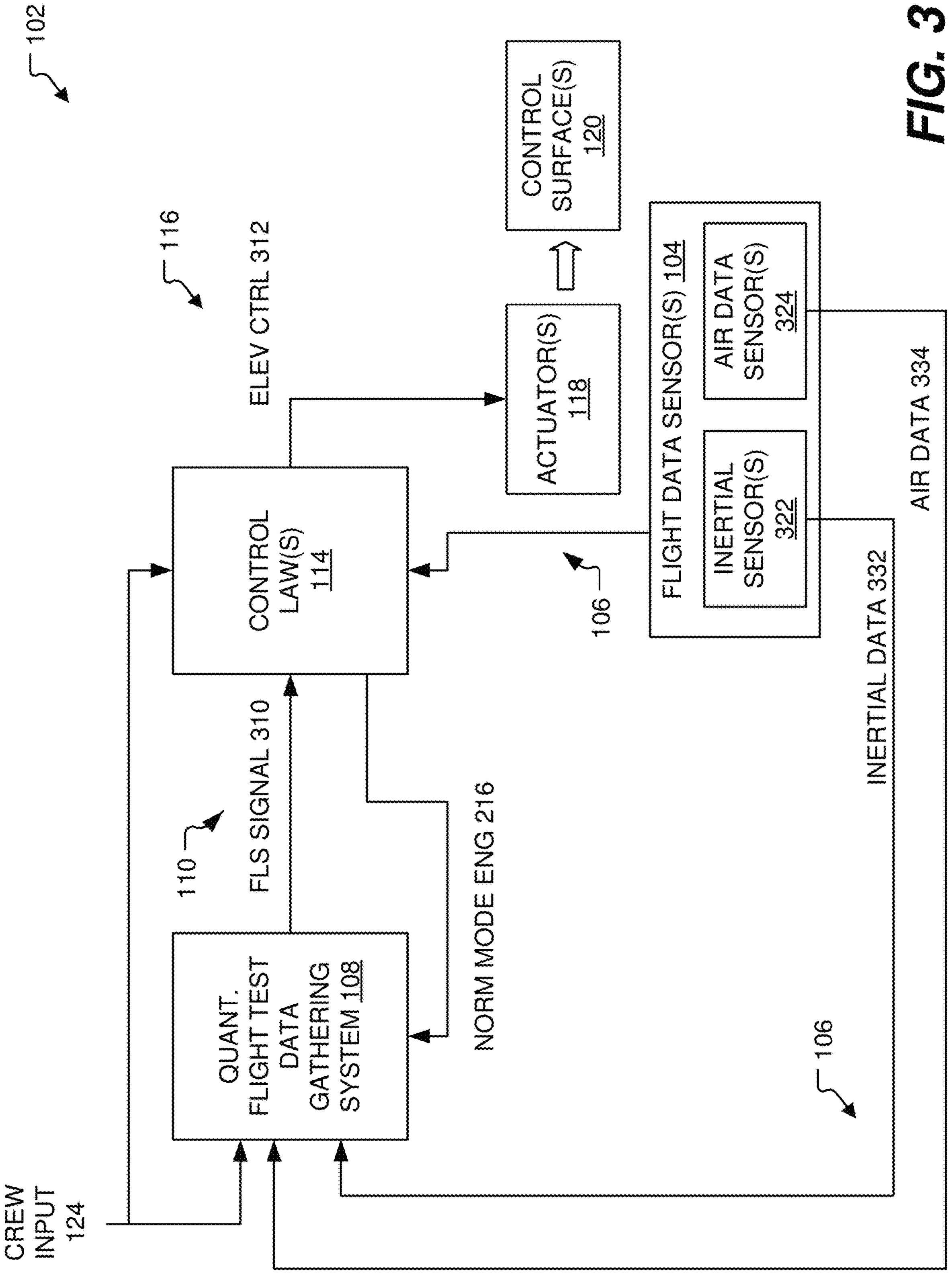
FIG. 3 is a diagram of a particular example of the system for gathering flight test data of FIG. 1.

FIG. 3 illustrates another example of the system 102 of FIG. 1. In the particular example illustrated in FIG. 3, the system 102 includes the quantitative flight test data gathering system 108, the control laws 114, the actuators 118, the control surfaces 120, and the flight data sensors 104 described with reference to FIG. 1. Other features or components of the aircraft 100 of FIG. 1 may also be present; however, such features or components are omitted from FIG. 3 merely to highlight certain aspects of the system 102 in a particular example. To illustrate, the system 102 of FIG. 3 can also include each of the components and features described with reference to FIG. 2.

In the example of FIG. 3, the system 102 is configured to gather quantitative flight test data (e.g., the quantitative flight test data 128 of FIG. 1) during execution of a Flight Loads Survey (FLS) maneuver, such as a normal load factor (Nz) Pull-Up and Push-Over Maneuver. In this example, the flight data sensors 104 include at least one or more inertial sensors 322 and one or more air data sensors 324. Thus, in FIG. 3, the sensor data 106 includes inertial data 332 and air data 334. Examples of inertial sensors 322 include accelerometers, gyroscopes, etc. Examples of air data sensors 324 include pitot tubes, static ports, angle-of-attack sensors, air temperature sensors, etc. The inertial data 332 can be indicative of Nz (e.g., a component of g-load in the vertical direction), other components of g-load, rates of change of g-load, etc.

In the example of FIG. 3, the control law(s) 114 are configured to generate control signals 116 that include at least elevator control signals 312 ("ELEV CTRL"). In some examples, the elevator control signals 312 are provided to the actuator(s) 118 to cause the actuator(s) 118 to move one or more of the control surface(s) 120 of the aircraft 100, such as the elevators 142. In some implementations, the control law(s) 114 may also be configured to generate the normal mode engage signal 216 ("NORM MODE ENG") as described with reference to FIG. 2.

In the particular example illustrated, the quantitative flight test data gathering system 108 is configured to provide signal(s) 110 to the control laws 114 to initiate and/or control execution of the Nz Pull-Up and Push-Over (roller coaster) Maneuver. For example, the signal(s) 110 can include flight load survey signal(s) 310 ("FLS SIGNAL"). The flight load survey signal(s) 310 can cause the aircraft 100 to fly according to the Nz Pull-Up and Push-Over Maneuver.

The Nz Pull-Up and Push-Over Maneuver is performed by smoothly sweeping the Nz from a lower target to an upper target. During the Nz sweep, the aircraft remains within speed and altitude tolerances and Nz limits. Exceeding Nz limits may require termination of flight testing until the aircraft can be inspected. The Nz Pull-Up and Push-Over Maneuver can be described in three phases including a setup phase, a sweep phase, and a recovery phase. Much of the time is spent in the setting up and recovery phases, while the sweep phase takes only 5 or so seconds. When flown by a pilot, the Nz Pull-Up and Push-Over Maneuver is basically performed open-loop, as there is not enough time for the pilot to receive feedback from the airplane response and make corrections. Accordingly, these maneuvers are practiced extensively in simulations on the ground, and then pilots generally make additional adjustments on the actual flight test airplane to account for different test conditions, inaccurate modeling, and other aerodynamic and atmospheric uncertainties. This is a time-consuming and inefficient process that often takes multiple attempts, sometimes over multiple flight test days.

Using the quantitative flight test data gathering system 108 to control the maneuver can make the maneuver more repeatable and efficient. For example, the quantitative flight test data gathering system 108 can be configured to provide column input (e.g., the FLS signal(s) 310) that provides a target Nz profile. The precise elevator control signals 312 generated by the control laws 114 for particular FLS signal(s) 310 are known due to the mathematical definition of the control laws 114. Thus, based on the control laws 114, designers can determine a relationship between a steady-state column input (e.g., the FLS signal(s) 310) and the steady-state Nz output of the aircraft 100.

As a first approach, the simple steady-state relationship can be used to determine step column inputs that are sized to reach the desired Nz targets without any consideration for the transient response, such as how long the sweep takes and the trajectory of the Nz response between the sweep targets. Modeling has shown that even this simple approach to determine column input to perform the Nz Pull-Up and Push-Over Maneuver can result in successful performance of the maneuver.

If the quantitative flight test data gathering system 108 is configured to use the simple step column input described above, a pilot manually sets the aircraft configuration and speed to the conditions from which the maneuver can be performed while staying within the desired speed range. This increases the likelihood of a successful flight testing maneuver, which reduces costs, flight time, and pilot strain. Additionally, the Nz Pull-Up and Push-Over Maneuver is more repeatable when controlled by the quantitative flight test data gathering system 108, thereby enabling generation of more robust quantitative flight test data 128.

The simple step column input described above can be improved by using ramp column input instead of step column input. While a step column input will result in a constant Nz for the aircraft 100, the Nz Pull-Up and Push-Over Maneuver is intended to generate a constant Nz rate during the sweep phase. A constant Nz rate can be achieved (or approached) by using a ramp column input for at least a portion of the maneuver.

Additionally, or alternatively, the column input can be shaped to cancel out or reduce short period dynamics that tend to oppose a linear g-rate. Inverse short period dynamics can be applied to achieve or approach a linear g-rate. Modeling has shown that shaping the column input in this manner can improve linearity of the Nz response, which improves data quality.

Using the quantitative flight test data gathering system 108 to control performance of the maneuver may also enable other changes to generate high-quality data. For example, one way to increase data quality is to perform the Nz sweep as slowly as possible while still staying within speed and altitude tolerances. However, there is a balance between reducing speed change and increasing sweep duration. By using the quantitative flight test data gathering system 108, a test designer can specify a targeted g-rate, and the quantitative flight test data gathering system 108 can determine shaped column input (e.g., FLS signal(s) 310) to fly the maneuver to achieve the target g-rate. Execution of the maneuver can also be reliably repeated for different test conditions by parameterizing the whole column input profile. When the column input profile is parameterized, the overall shape can be shared between all test conditions, and only the amplitudes and durations of phases are varied, thereby enabling generation of comparable data for the different test conditions.

In the example illustrated in FIG. 3, the Nz Pull-Up and Push-Over Maneuver can be controlled by the quantitative flight test data gathering system 108. For example, the quantitative flight test data gathering system 108 can use the air data 334 and the inertial data 332 to calculate column input (e.g., the FLS signal(s) 310) to execute the maneuver. The column input can include step column input, ramp column input, or shaped column input, as described above.

Using the quantitative flight test data gathering system 108 to automatically fly the Nz Pull-Up and Push-Over Maneuver can also reduce the flight time required for each execution of the maneuver as compared to manual flight of the maneuver.

Further, using the quantitative flight test data gathering system 108 to automatically fly the Nz Pull-Up and Push-Over Maneuver may be safer since the quantitative flight test data gathering system 108 can monitor the Nz (via the inertial data 332) during the maneuver and can generate the FLS signal(s) 310 based in part on the actual Nz experienced by the aircraft 100. By monitoring the Nz in real time, the quantitative flight test data gathering system 108 can disconnect or recover the aircraft 100 if a potential Nz exceedance is detected or if some other condition indicates that the maneuver is unlikely to be successful.

Additionally, recovery of the aircraft 100 from the maneuver can be shortened (as compared to manual control) and simplified by allowing the Full Automation Mode control laws 114 to perform the recovery operations without any special inputs. In some implementations, the quantitative flight test data gathering system 108 can initiate the recovery phase responsive to detection of a flight test endpoint, responsive to an indication of a fault associated with an aircraft system, or responsive to the crew input 124. A flight test endpoint can be indicative of successful completion of the Nz Pull-Up and Push-Over Maneuver or indicative of a determination that execution of the maneuver is unlikely to result in useful data. As an example, a flight test endpoint can be detected based on a determination that the inertial data 332 indicates that a Nz target has been reached. As another example, a flight test endpoint can be detected based on a determination that a difference between a rate of change of g-load of the aircraft and an expected rate of change of g-load of the aircraft satisfies a g-load rate deviation limit.

Figure 4:
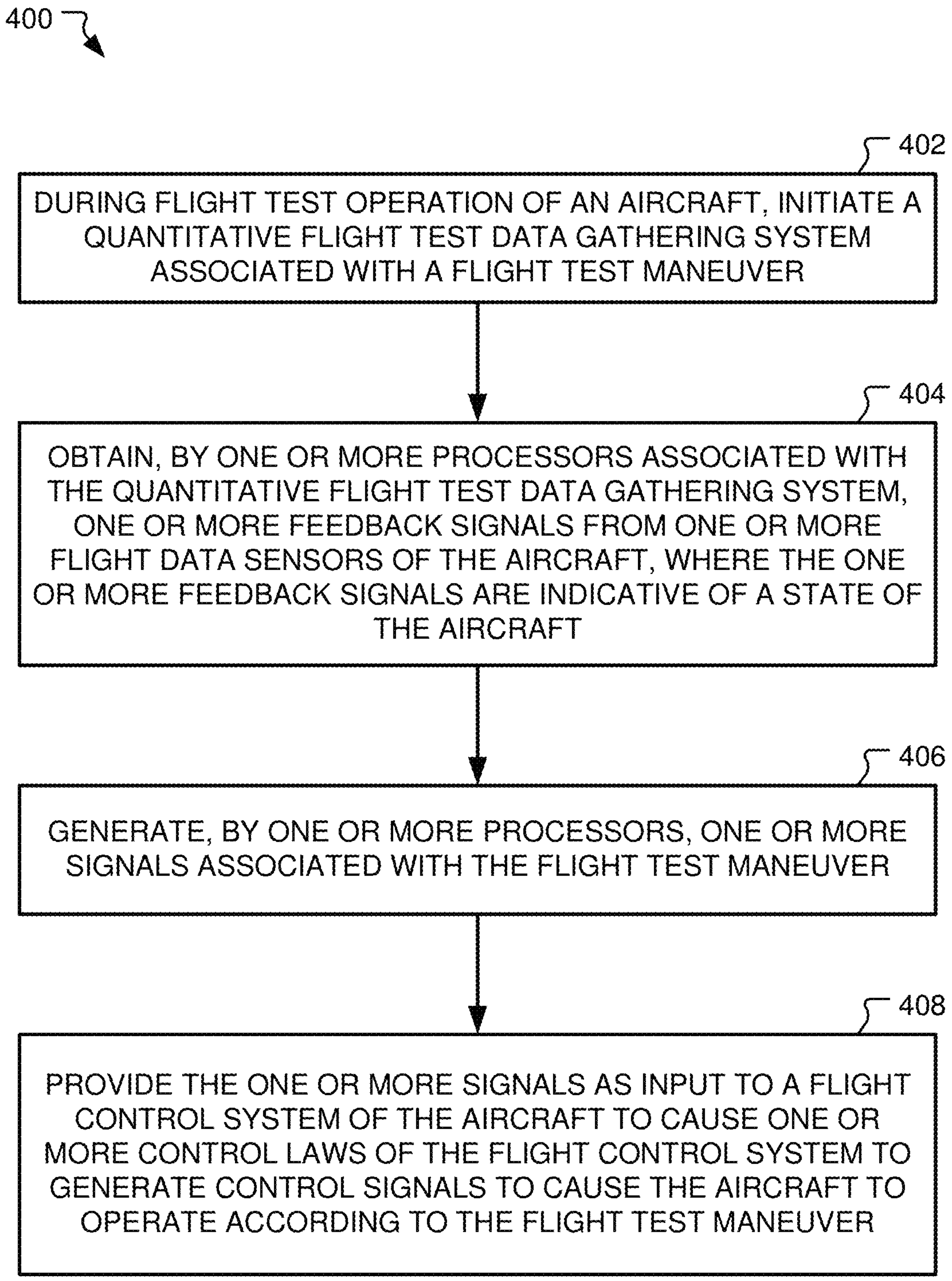
FIG. 4 is a diagram that illustrates a flow chart of an example of a method of gathering flight test data.

FIG. 4 is a diagram that illustrates a flow chart of an example of a method 400 of gathering flight test data. The method 400 can be performed by the quantitative flight test data gathering system 108 of any of FIGS. 1-3. The quantitative flight test data gathering system 108 can be integrated in or embodied in one or more LRUs. For example, the LRU(s) can include one or more processors and a memory storing instructions that are executable by the processor(s) to initiate, perform, or control the operations of the method 400.

The method 400 includes, at block 402, during flight test operation of an aircraft, initiating a quantitative flight test data gathering system associated with a flight test maneuver. For example, the quantitative flight test data gathering system 108 of any of FIGS. 1-3 can be initiated responsive to crew input 124 during flight test operations of the aircraft 100. The quantitative flight test data gathering system 108 may be configured to operate in conjunction with one or more control laws (e.g., the control laws 114) in a closed-loop manner to dynamically modify one or more states of the aircraft 100 to generate quantitative flight test data 128 over a range of states.

The method 400 includes, at block 404, obtaining, by one or more processors associated with the quantitative flight test data gathering system, one or more feedback signals from one or more flight data sensors of the aircraft. In some examples, at least one feedback signal of the one or more feedback signals is provided as input to both the one or more processors associated with the quantitative flight test data gathering system to control laws of the flight control system.

The feedback signal(s) are indicative of a state of the aircraft. For example, the feedback signal(s) can include or correspond to the sensor data 106 of any of FIGS. 1-3. To illustrate, the feedback signal(s) can indicate, among other things, the elevator position 232, the horizontal stabilizer position 234, the pitch rate 236 of the aircraft 100, airspeed of the aircraft 100 (e.g., the calibrated airspeed 238), inertial data 332 associated with the aircraft 100 (e.g., a g-load or a specific component of g-load, such as Nz), other air data associated with the aircraft 100 (e.g., air data 334), other aircraft state information, or combinations thereof. In some cases, the feedback signal(s) can also include signals from the control law(s) 114 (e.g., the horizontal stabilizer control signal 212 or the elevator control signal 214) or information based, at least in part, on signals from the control law(s) 114 (e.g., an indication of the blowdown condition, such as the blowdown condition signal 240).

The method 400 includes, at block 406, generating, by one or more processors, one or more signals associated with the flight test maneuver, and at block 408, providing the one or more signals as input to a flight control system of the aircraft to cause one or more control laws of the flight control system to generate control signals to cause the aircraft to operate according to the flight test maneuver. For example, the quantitative flight test data gathering system 108 can generate the signals 110, examples of which include, but are not limited to, the SET engage command 210 of FIG. 2 and the FLS signal(s) 310 of FIG. 3.

In some implementations, the method 400 also includes gathering the quantitative flight test data 128 during execution of the flight test maneuver. In some such implementations, a model associated with the aircraft can be generated or updated based on the quantitative flight test data 128.

In some implementations, the method 400 includes initiating a recovery phase of the flight test maneuver responsive to detection of a flight test endpoint condition. The flight test endpoint condition may be detected responsive to receipt of sensor data associated with a test goal, receipt of sensor data associated with a safety limit, or receipt of sensor data associated with an aircraft system fault. As an example, when the flight test maneuver includes or corresponds to a stabilizer-elevator trade maneuver, the method 400 can include initiating the recovery phase of the flight test maneuver responsive to detection of an elevator blowdown condition, responsive to a determination that a stabilizer position satisfies a stabilizer limit, or responsive to a determination that a stabilizer position satisfies a stabilizer position target. As another example, when the flight test maneuver includes or corresponds to a Nz Pull-Up and Push-Over Maneuver, the method 400 can include initiating the recovery phase of the flight test maneuver responsive to a determination that a normal load factor of the aircraft satisfies a normal load factor target or responsive to a determination that a difference between a rate of change of g-load of the aircraft and an expected rate of change of g-load of the aircraft satisfies a g-load rate deviation limit.

In some implementations, the method 400 also includes disengaging the quantitative flight test data gathering system responsive to detection of receipt of input via a crew input device. For example, during automated execution of a flight test maneuver, the quantitative flight test data gathering system 108 of any of FIGS. 1-3 can disengage responsive to the crew input 124.

Figure 5:
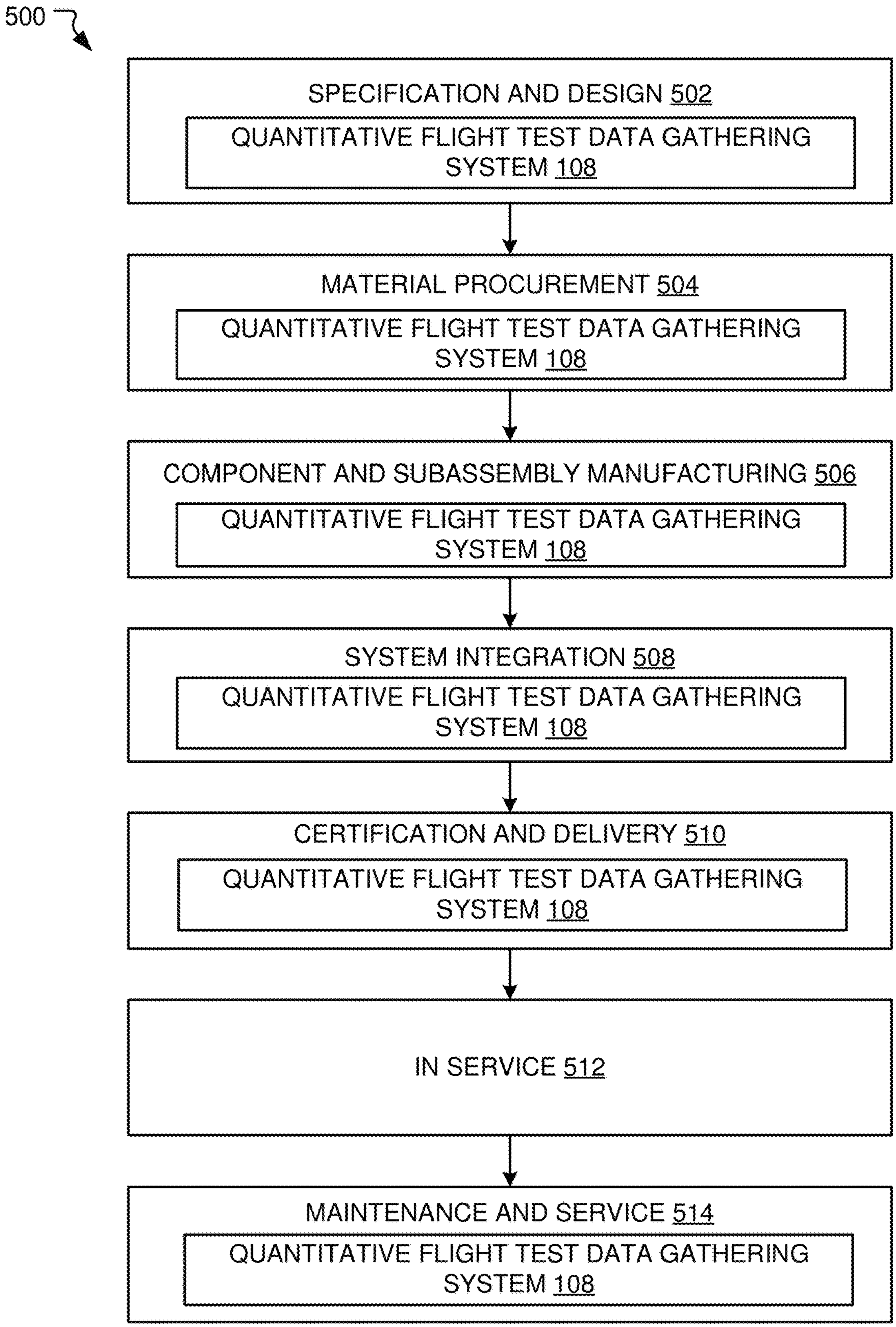
FIG. 5 is a flow chart illustrating an example of a life cycle of the aircraft of FIG. 1.

FIG. 5 is a flow chart illustrating a life cycle of an aircraft that includes the quantitative flight test data gathering system 108 and/or other components of the system 102 of FIG. 1. For example, the aircraft can correspond to the aircraft 100 of FIG. 1.

During pre-production, the exemplary method 500 includes, at 502, specification and design of an aircraft, such as the aircraft 600 described with reference to FIG. 6. During specification and design of the aircraft, the method 500 may include specification and design of the quantitative flight test data gathering system 108. At 504, the method 500 includes material procurement, which may include procuring materials for the quantitative flight test data gathering system 108.

During production, the method 500 includes, at 506, component and subassembly manufacturing and, at 508, system integration of the aircraft. For example, the method 500 may include component and subassembly manufacturing of the quantitative flight test data gathering system 108 and system integration of the quantitative flight test data gathering system 108. At 510, the method 500 includes certification and delivery of the aircraft and, at 512, placing the aircraft in service. Aircraft testing during the certification and delivery phase may include the quantitative flight test data gathering system 108 which may be used to gather quantitative flight test data. While in service by a customer, the aircraft may be scheduled for routine maintenance and service (which may also include modification, reconfiguration, refurbishment, and so on). At 514, the method 500 includes performing maintenance and service on the aircraft, which may include performing maintenance and service. For example, the quantitative flight test data gathering system 108 can be used to gather quantitative flight test data for maintenance or service.

Each of the processes of the method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 6:
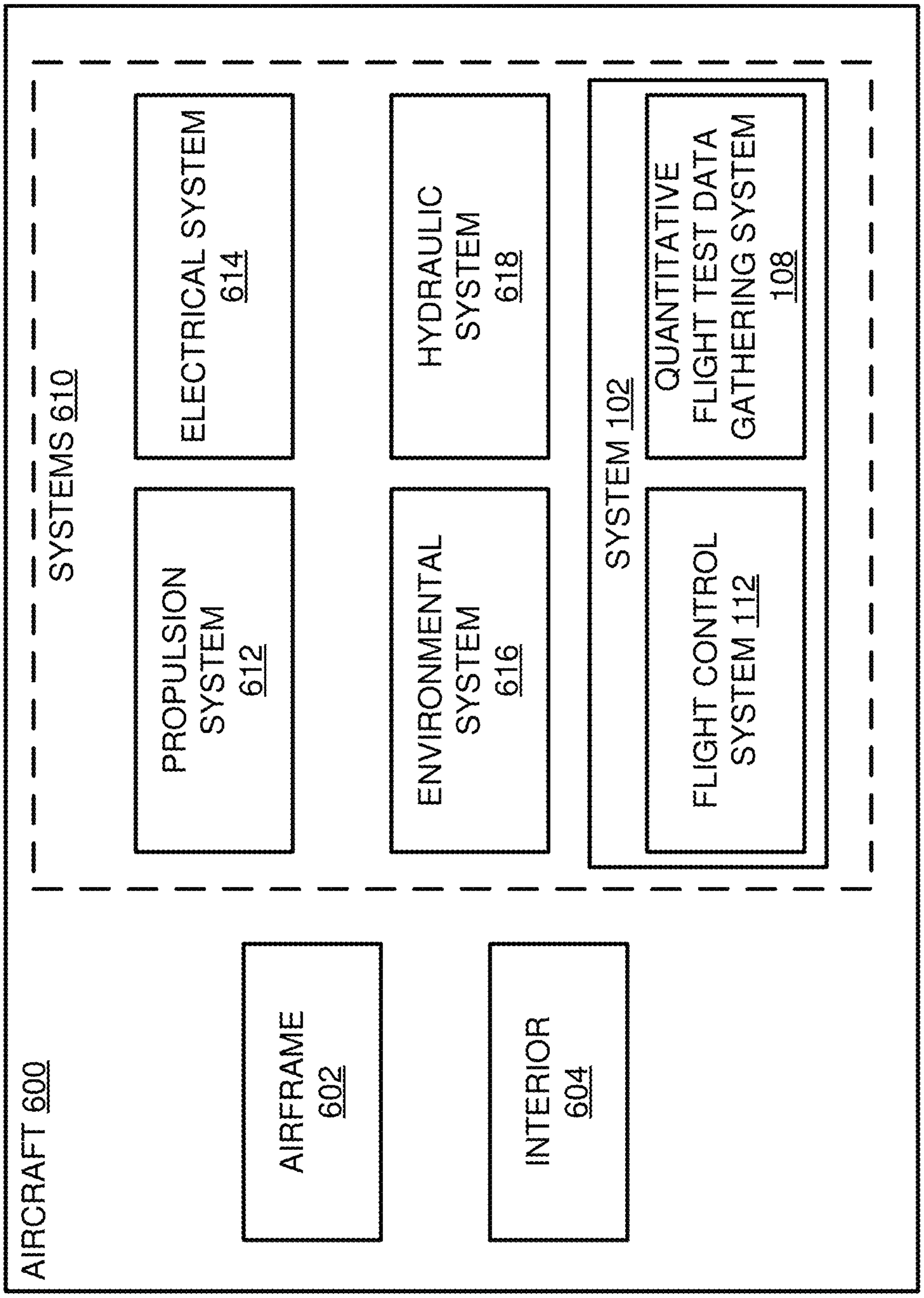
FIG. 6 is a block diagram of a particular example of the aircraft of FIG. 1.

FIG. 6 is a block diagram of a particular example of an aircraft 600. The aircraft 600 is an example of the aircraft 100 of FIG. 1. In the example of FIG. 6, the aircraft 600 includes an airframe 602 with a plurality of systems 610 and an interior 604. Examples of the plurality of systems 610 include one or more of a propulsion system 612, an electrical system 614, an environmental system 616, and a hydraulic system 618. The systems 610 in FIG. 6 also include the system 102 of FIG. 1. To illustrate, the systems 610 include the quantitative flight test data gathering system 108 and the flight control system 112 of FIG. 1. Any number of other systems may be included.

Figure 7:
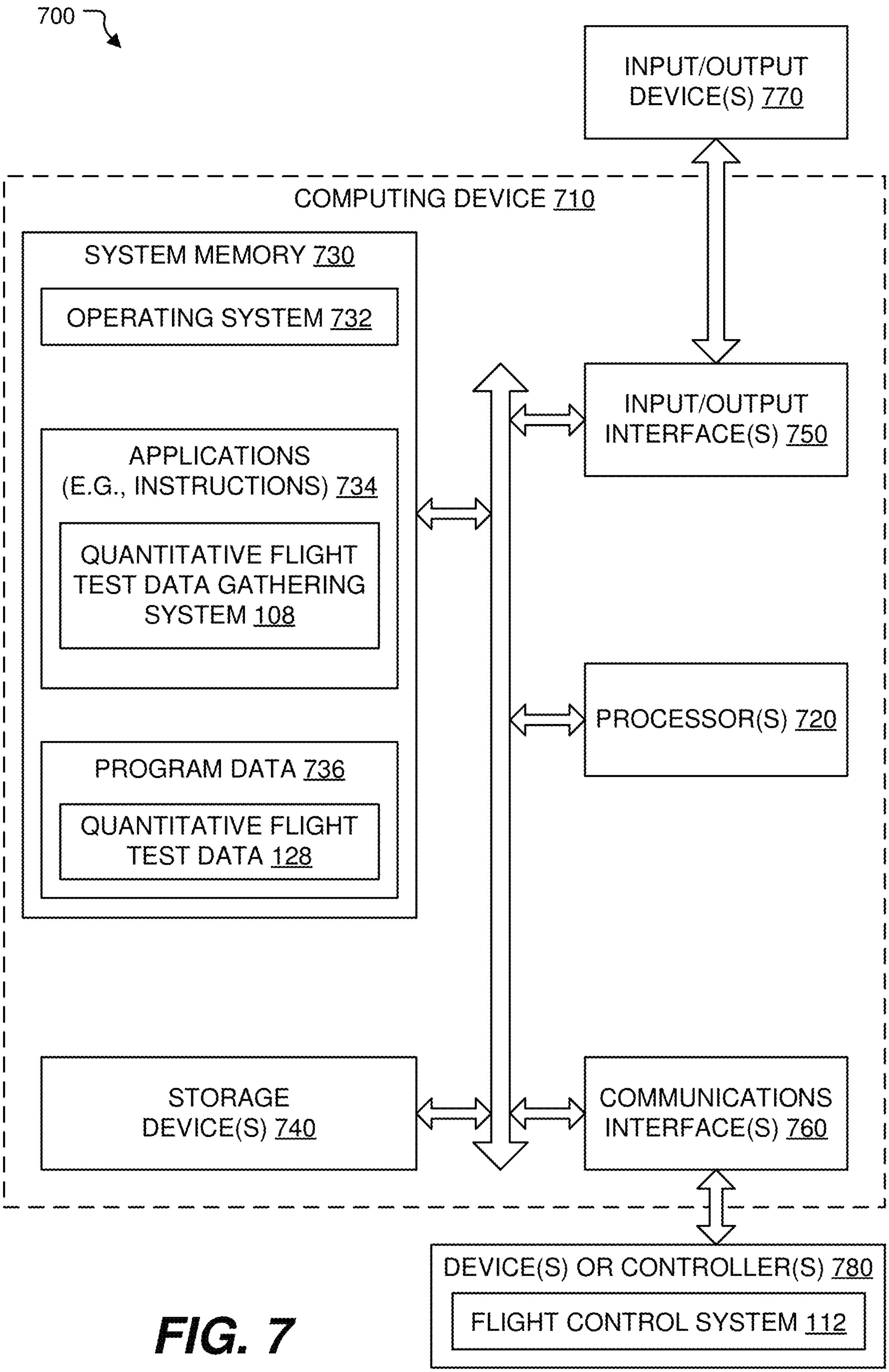
FIG. 7 is a block diagram of a computing environment including a computing device configured to support aspects of computer-implemented methods and computer-executable program instructions (or code) according to the present disclosure.

FIG. 7 is a block diagram of a computing environment 700 including a computing device 710 configured to support aspects of computer-implemented methods and computer-executable program instructions (or code) according to the present disclosure. For example, the computing device 710, or portions thereof, is configured to execute instructions to initiate, perform, or control one or more operations described with reference to FIGS. 1-6.

The computing device 710 includes one or more processors 720. The processor(s) 720 are configured to communicate with system memory 730, one or more storage devices 740, one or more input/output interfaces 750, one or more communications interfaces 760, or any combination thereof. The system memory 730 includes volatile memory devices (e.g., random access memory (RAM) devices), nonvolatile memory devices (e.g., read-only memory (ROM) devices, programmable read-only memory, and flash memory), or both. The system memory 730 stores an operating system 732, which may include a basic input/output system for booting the computing device 710 as well as a full operating system to enable the computing device 710 to interact with users, other programs, and other devices. The system memory 730 stores system (program) data 736, such as the quantitative flight test data 128.

The system memory 730 includes one or more applications 734 (e.g., sets of instructions) executable by the processor(s) 720. As an example, the one or more applications 734 include instructions executable by the processor(s) 720 to initiate, control, or perform one or more operations described with reference to FIGS. 1-6. To illustrate, the one or more applications 734 include instructions executable by the processor(s) 720 to initiate, control, or perform one or more operations described with reference to the quantitative flight test data gathering system 108.

In a particular implementation, the system memory 730 includes a non-transitory, computer readable medium storing the instructions that, when executed by the processor(s) 720, cause the processor(s) 720 to initiate, perform, or control operations to execute one or more flight test maneuvers. The operations include, during flight test operation of an aircraft, initiating a quantitative flight test data gathering system associated with a flight test maneuver; obtaining, by one or more processors associated with the quantitative flight test data gathering system, one or more feedback signals from one or more flight data sensors of the aircraft, where the one or more feedback signals are indicative of a state of the aircraft; generating, by one or more processors, one or more signals associated with the flight test maneuver; and providing the one or more signals as input to a flight control system of the aircraft to cause one or more control laws of the flight control system to generate control signals to cause the aircraft to operate according to the flight test maneuver.

The one or more storage devices 740 include nonvolatile storage devices, such as magnetic disks, optical disks, or flash memory devices. In a particular example, the storage devices 740 include both removable and non-removable memory devices. The storage devices 740 are configured to store an operating system, images of operating systems, applications (e.g., one or more of the applications 734), and program data (e.g., the program data 736). In a particular aspect, the system memory 730, the storage devices 740, or both, include tangible computer-readable media. In a particular aspect, one or more of the storage devices 740 are external to the computing device 710.

The one or more input/output interfaces 750 enable the computing device 710 to communicate with one or more input/output devices 770 to facilitate user interaction. For example, the one or more input/output interfaces 750 can include a display interface, an input interface, or both. For example, the input/output interface 750 is adapted to receive input from a user, to receive input from another computing device, or a combination thereof. In some implementations, the input/output interface 750 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 770 includes one or more user interface devices and displays, including some combination of buttons, keyboards, pointing devices, displays, speakers, microphones, touch screens, and other devices.

The processor(s) 720 are configured to communicate with devices or controllers 780 via the one or more communications interfaces 760. For example, the one or more communications interfaces 760 can include a network interface. The devices or controllers 780 can include, for example, the flight control system 112, one or more other devices, or any combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-7. In some implementations, part or all of one or more of the operations or methods of FIGS. 1-7 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, an aircraft includes one or more flight data sensors; one or more control surfaces; one or more actuators coupled to the control surfaces; and a quantitative flight test data gathering system communicatively coupled to a flight control system and to the flight data sensors. The quantitative flight test data gathering system is configured to, during flight test operation of the aircraft, obtain, from the one or more flight data sensors, the flight control system, or both, one or more feedback signals indicative of a state of the aircraft. The quantitative flight test data gathering system is configured to generate, based at least in part on the feedback signals, one or more signals associated with a flight test maneuver. The quantitative flight test data gathering system is configured to provide the one or more signals as input to the flight control system to cause one or more control laws of the flight control system to generate control signals for the one or more actuators to cause the aircraft to operate according to the flight test maneuver.

Example 2 includes the aircraft of Example 1, wherein the quantitative flight test data gathering system is further configured to gather quantitative flight test data during execution of the flight test maneuver.

Example 3 includes the aircraft of Example 1 or Example 2, wherein at least one feedback signal provided to the quantitative flight test data gathering system is also provided to the flight control system.

Example 4 includes the aircraft of any of Examples 1 to 3, wherein the quantitative flight test data gathering system is further configured to initiate a recovery phase of the flight test maneuver responsive to detection of a flight test endpoint condition.

Example 5 includes the aircraft of Example 4, wherein the quantitative flight test data gathering system is configured to detect the flight test endpoint condition responsive to receipt of sensor data associated with a test goal.

Example 6 includes the aircraft of Example 4 or Example 5, wherein the quantitative flight test data gathering system is configured to detect the flight test endpoint condition responsive to receipt of sensor data associated with a safety limit.

Example 7 includes the aircraft of any of Examples 4 to 6, wherein the quantitative flight test data gathering system is configured to detect the flight test endpoint condition responsive to receipt of sensor data associated with an aircraft system fault.

Example 8 includes the aircraft of any of Examples 1 to 7, wherein the quantitative flight test data gathering system is configured to disengage responsive to detection of receipt of input via a crew input device.

Example 9 includes the aircraft of any of Examples 1 to 8, wherein the flight test maneuver includes or corresponds to a stabilizer-elevator trade maneuver.

Example 10 includes the aircraft of Example 9, wherein the quantitative flight test data gathering system is further configured to initiate a recovery phase of the flight test maneuver responsive to detection of an elevator blowdown condition.

Example 11 includes the aircraft of Example 9 or Example 10, wherein the quantitative flight test data gathering system is further configured to initiate a recovery phase of the flight test maneuver responsive to a determination that a stabilizer position satisfies a stabilizer limit.

Example 12 includes the aircraft of any of Examples 9 to 11, wherein the quantitative flight test data gathering system is further configured to initiate a recovery phase of the flight test maneuver responsive to a determination that a stabilizer position satisfies a stabilizer position target.

Example 13 includes the aircraft of any of Examples 9 to 12, wherein: the one or more signals include a stabilizer command directing movement of a horizontal stabilizer of the aircraft; the one or more control signals include a horizontal stabilizer signal based on the stabilizer command and an elevator signal generated by the one or more control laws to reject pitch disturbances due to the stabilizer command; and the one or more feedback signals are indicative of speed of the aircraft, a pitch rate of the aircraft, or both.

Example 14 includes the aircraft of any of Examples 1 to 8, wherein the flight test maneuver includes or corresponds to a Flight Loads Survey (FLS) normal load factor (Nz) Pull-Up and Push-Over Maneuver.

Example 15 includes the aircraft of Example 14, wherein the quantitative flight test data gathering system is further configured to initiate a recovery phase of the flight test maneuver responsive to a determination that a normal load factor of the aircraft satisfies a normal load factor target.

Example 16 includes the aircraft of Example 14 or Example 15, wherein the quantitative flight test data gathering system is further configured to initiate a recovery phase of the flight test maneuver responsive to a determination that a difference between a rate of change of g-load of the aircraft and an expected rate of change of g-load of the aircraft satisfies a g-load rate deviation limit.

Example 17 includes the aircraft of any of Examples 14 to 16, wherein: the one or more signals include one or more elevator commands; the one or more control signals include one or more control surface signals to change a pitch of the aircraft; and the one or more feedback signals are indicative of air data measurements for the aircraft, inertial measurements for the aircraft, or a combination thereof.

According to Example 18, a method includes, during flight test operation of an aircraft, initiating a quantitative flight test data gathering system associated with a flight test maneuver. The method also includes obtaining, by one or more processors associated with the quantitative flight test data gathering system, one or more feedback signals from one or more flight data sensors of the aircraft, where the one or more feedback signals are indicative of a state of the aircraft. The method also includes generating, by one or more processors, one or more signals associated with the flight test maneuver and providing the one or more signals as input to a flight control system of the aircraft to cause one or more control laws of the flight control system to generate control signals to cause the aircraft to operate according to the flight test maneuver.

Example 19 includes the method of Example 18 and further includes gathering quantitative flight test data during execution of the flight test maneuver.

Example 20 includes the method of Example 19 and further includes generating or updating a model associated with the aircraft based on the quantitative flight test data.

Example 21 includes the method of any of Examples 18 to 20, wherein at least one feedback signal of the one or more feedback signals is provided as input to both the one or more processors associated with the quantitative flight test data gathering system and the control laws of the flight control system.

Example 22 includes the method of any of Examples 18 to 21 and further includes initiating, by the one or more processors, a recovery phase of the flight test maneuver responsive to detection of a flight test endpoint condition.

Example 23 includes the method of Example 22, wherein the flight test endpoint condition is detected responsive to receipt of sensor data associated with a test goal.

Example 24 includes the method of Example 22 or Example 23, wherein the flight test endpoint condition is detected responsive to receipt of sensor data associated with a safety limit.

Example 25 includes the method of any of Examples 22 to 24, wherein the flight test endpoint condition is detected responsive to receipt of sensor data associated with an aircraft system fault.

Example 26 includes the method of any of Examples 18 to 25 and further includes disengaging the quantitative flight test data gathering system responsive to detection of receipt of input via a crew input device.

Example 27 includes the method of any of Examples 18 to 26, wherein the quantitative flight test data gathering system is configured to operate in conjunction with the one or more control laws in a closed-loop manner to dynamically modify one or more states of the aircraft to generate quantitative flight test data over a range of states.

Example 28 includes the method of any of Examples 18 to 27, wherein the flight test maneuver includes or corresponds to a stabilizer-elevator trade maneuver.

Example 29 includes the method of Example 28 and further includes initiating, by the one or more processors, a recovery phase of the flight test maneuver responsive to detection of an elevator blowdown condition.

Example 30 includes the method of Example 28 and further includes initiating, by the one or more processors, a recovery phase of the flight test maneuver responsive to a determination that a stabilizer position satisfies a stabilizer limit.

Example 31 includes the method of Example 28 and further includes initiating, by the one or more processors, a recovery phase of the flight test maneuver responsive to a determination that a stabilizer position satisfies a stabilizer position target.

Example 32 includes the method of any of Examples 28 to 31, wherein: the one or more signals include a stabilizer command directing movement of a horizontal stabilizer of the aircraft; the one or more control signals include a horizontal stabilizer signal based on the stabilizer command and an elevator signal generated by the one or more control laws to reject pitch disturbances due to the stabilizer command; and the one or more feedback signals are indicative of speed of the aircraft, a pitch rate of the aircraft, or both.

Example 33 includes the method of any of Examples 18 to 27, wherein the flight test maneuver includes or corresponds to a Flight Loads Survey (FLS) normal load factor (Nz) Pull-Up and Push-Over Maneuver.

Example 34 includes the method of Example 33 and further includes initiating, by the one or more processors, a recovery phase of the flight test maneuver responsive to a determination that a normal load factor of the aircraft satisfies a normal load factor target.

Example 35 includes the method of Example 33 and further includes initiating, by the one or more processors, a recovery phase of the flight test maneuver responsive to a determination that a difference between a rate of change of g-load of the aircraft and an expected rate of change of g-load of the aircraft satisfies a g-load rate deviation limit.

Example 36 includes the method of any of Examples 33 to 35, wherein: the one or more signals include one or more elevator commands; the one or more control signals include one or more control surface signals to change a pitch of the aircraft; and the one or more feedback signals are indicative of air data measurements for the aircraft, inertial measurements for the aircraft, or a combination thereof.

According to Example 37, a non-transitory computer-readable medium stores instructions that are executable by one or more processors to cause the processors to, during flight test operation of an aircraft, initiate a quantitative flight test data gathering system associated with a flight test maneuver. The instructions are executable to cause the processors to obtain one or more feedback signals from one or more flight data sensors of the aircraft, where the one or more feedback signals are indicative of a state of the aircraft. The instructions are executable to cause the processors to generate one or more signals associated with the flight test maneuver. The instructions are executable to cause the processors to provide the one or more signals as input to a flight control system of the aircraft to cause one or more control laws of the flight control system to generate control signals to cause the aircraft to operate according to the flight test maneuver.

Example 38 includes the non-transitory computer-readable medium of Example 37, wherein the instructions are further executable to cause the one or more processors to gather quantitative flight test data during execution of the flight test maneuver.

Example 39 includes the non-transitory computer-readable medium of Example 37 or Example 38, wherein the instructions are further executable to cause the one or more processors to initiate a recovery phase of the flight test maneuver responsive to detection of a flight test endpoint condition.

Example 40 includes the non-transitory computer-readable medium of Example 39, wherein the instructions are further executable to cause the one or more processors to detect the flight test endpoint condition responsive to receipt of sensor data associated with a test goal.

Example 41 includes the non-transitory computer-readable medium of Example 39 or Example 40, wherein the instructions are further executable to cause the one or more processors to detect the flight test endpoint condition responsive to receipt of sensor data associated with a safety limit.

Example 42 includes the non-transitory computer-readable medium of any of Examples 39 to 41, wherein the instructions are further executable to cause the one or more processors to detect the flight test endpoint condition responsive to receipt of sensor data associated with an aircraft system fault.

Example 43 includes the non-transitory computer-readable medium of any of Examples 37 to 42, wherein the instructions are further executable to cause the one or more processors to disengage the quantitative flight test data gathering system responsive to detection of receipt of input via a crew input device.

Example 44 includes the non-transitory computer-readable medium of any of Examples 37 to 43, wherein the quantitative flight test data gathering system is configured to operate in conjunction with the one or more control laws in a closed loop manner to dynamically modify one or more states of the aircraft to generate quantitative flight test data over a range of states.

Example 45 includes the non-transitory computer-readable medium of any of Examples 37 to 44, wherein the flight test maneuver includes or corresponds to a stabilizer-elevator trade maneuver.

Example 46 includes the non-transitory computer-readable medium of Example 45, wherein the instructions are further executable to cause the one or more processors to initiate a recovery phase of the flight test maneuver responsive to detection of an elevator blowdown condition.

Example 47 includes the non-transitory computer-readable medium of Example 45 or Example 46, wherein the instructions are further executable to cause the one or more processors to initiate a recovery phase of the flight test maneuver responsive to a determination that a stabilizer position satisfies a stabilizer limit.

Example 48 includes the non-transitory computer-readable medium of any of Examples 45 to 47, wherein the instructions are further executable to cause the one or more processors to initiate a recovery phase of the flight test maneuver responsive to a determination that a stabilizer position satisfies a stabilizer position target.

Example 49 includes the non-transitory computer-readable medium of any of Examples 45 to 48, wherein: the one or more signals include a stabilizer command directing movement of a horizontal stabilizer of the aircraft; the one or more control signals include a horizontal stabilizer signal based on the stabilizer command and an elevator signal generated by the one or more control laws to reject pitch disturbances due to the stabilizer command; and the one or more feedback signals are indicative of speed of the aircraft, a pitch rate of the aircraft, or both.

Example 50 includes the non-transitory computer-readable medium of any of Examples 37 to 44, wherein the flight test maneuver includes or corresponds to a Flight Loads Survey (FLS) normal load factor (Nz) Pull-Up and Push-Over Maneuver.

Example 51 includes the non-transitory computer-readable medium of Example 50, wherein the instructions are further executable to cause the one or more processors to initiate a recovery phase of the flight test maneuver responsive to a determination that a normal load factor of the aircraft satisfies a normal load factor target.

Example 52 includes the non-transitory computer-readable medium of Example 50 or Example 51, wherein the instructions are further executable to cause the one or more processors to initiate a recovery phase of the flight test maneuver responsive to a determination that a difference between a rate of change of g-load of the aircraft and an expected rate of change of g-load of the aircraft satisfies a g-load rate deviation limit.

Example 53 includes the non-transitory computer-readable medium of any of Examples 50 to 52, wherein: the one or more signals include one or more elevator commands; the one or more control signals include one or more control surface signals to change a pitch of the aircraft; and the one or more feedback signals are indicative of air data measurements for the aircraft, inertial measurements for the aircraft, or a combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
one or more flight data sensors;
one or more control surfaces;
one or more actuators coupled to the one or more control surfaces; and
a quantitative flight test data gathering system communicatively coupled to a flight control system and to the flight data sensors, wherein the quantitative flight test data gathering system is configured to, during flight test operation of the aircraft:
obtain, from the one or more flight data sensors, the flight control system, or both, one or more feedback signals indicative of a state of the aircraft;
generate, based at least in part on the one or more feedback signals, one or more signals associated with a flight test maneuver;
provide the one or more signals as input to the flight control system to cause one or more control laws of the flight control system to generate one or more control signals for the one or more actuators to cause the aircraft to operate according to the flight test maneuver; and
initiate a recovery phase of the flight test maneuver responsive to detection of a flight test endpoint condition.

2. The aircraft of claim 1, wherein the quantitative flight test data gathering system is further configured to gather quantitative flight test data during execution of the flight test maneuver.

3. The aircraft of claim 1, wherein at least one feedback signal provided to the quantitative flight test data gathering system is also provided to the flight control system.

4. The aircraft of claim 1, wherein the quantitative flight test data gathering system is configured to detect the flight test endpoint condition responsive to receipt of sensor data associated with a test goal.

5. The aircraft of claim 1, wherein the quantitative flight test data gathering system is configured to detect the flight test endpoint condition responsive to receipt of sensor data associated with a safety limit.

6. The aircraft of claim 1, wherein the quantitative flight test data gathering system is configured to detect the flight test endpoint condition responsive to receipt of sensor data associated with an aircraft system fault.

7. The aircraft of claim 1, wherein the quantitative flight test data gathering system is configured to disengage responsive to detection of receipt of input via a crew input device.

8. The aircraft of claim 1, wherein the flight test maneuver includes or corresponds to a stabilizer-elevator trade maneuver, and wherein:
the one or more signals include a stabilizer command directing movement of a horizontal stabilizer of the aircraft;
the one or more control signals include a horizontal stabilizer signal based on the stabilizer command and include an elevator signal generated by the one or more control laws to reject pitch disturbances due to the stabilizer command; and
the one or more feedback signals are indicative of speed of the aircraft, a pitch rate of the aircraft, or both.

9. The aircraft of claim 1, wherein the flight test maneuver includes or corresponds to a Flight Loads Survey (FLS) normal load factor (Nz) Pull-Up and Push-Over Maneuver, and wherein:
the one or more signals include one or more elevator commands;
the one or more control signals include one or more control surface signals to change a pitch of the aircraft; and
the one or more feedback signals are indicative of air data measurements for the aircraft, inertial measurements for the aircraft, or a combination thereof.

10. A method comprising:
during flight test operation of an aircraft, initiating a quantitative flight test data gathering system associated with a flight test maneuver;
obtaining, by one or more processors associated with the quantitative flight test data gathering system, one or more feedback signals from one or more flight data sensors of the aircraft, wherein the one or more feedback signals are indicative of a state of the aircraft;
generating, by one or more processors, one or more signals associated with the flight test maneuver;
providing the one or more signals as input to a flight control system of the aircraft to cause one or more control laws of the flight control system to generate control signals to cause the aircraft to operate according to the flight test maneuver; and
initiating, by the one or more processors, a recovery phase of the flight test maneuver responsive to detection of a flight test endpoint condition.

11. The method of claim 10, further comprising gathering quantitative flight test data during execution of the flight test maneuver.

12. The method of claim 11, further comprising generating or updating a model associated with the aircraft based on the quantitative flight test data.

13. The method of claim 10, wherein at least one feedback signal of the one or more feedback signals is provided as input to both the one or more processors associated with the quantitative flight test data gathering system and the one or more control laws of the flight control system.

14. The method of claim 10, further comprising disengaging the quantitative flight test data gathering system responsive to detection of receipt of input via a crew input device.

15. The method of claim 10, wherein the quantitative flight test data gathering system is configured to operate in conjunction with the one or more control laws in a closed loop manner to dynamically modify one or more states of the aircraft to generate quantitative flight test data over a range of states.

16. The method of claim 10, wherein the flight test maneuver includes or corresponds to a Flight Loads Survey (FLS) normal load factor (Nz) Pull-Up and Push-Over Maneuver.

17. The method of claim 16, wherein detection of the flight test endpoint condition includes a determination that a normal load factor of the aircraft satisfies a normal load factor target.

18. A non-transitory computer-readable medium storing instructions that are executable by one or more processors to cause the processors to, during flight test operation of an aircraft:
initiate a quantitative flight test data gathering system associated with a flight test maneuver;
obtain one or more feedback signals from one or more flight data sensors of the aircraft, wherein the one or more feedback signals are indicative of a state of the aircraft;
generate one or more signals associated with the flight test maneuver;

provide the one or more signals as input to a flight control system of the aircraft to cause one or more control laws of the flight control system to generate control signals to cause the aircraft to operate according to the flight test maneuver; and initiate a recovery phase of the flight test maneuver responsive to detection of a flight test endpoint condition.

19. The non-transitory computer-readable medium of claim 18, wherein the instructions are further executable by the one or more processors to cause the processors to, during the flight test operation of the aircraft, gather quantitative flight test data during execution of the flight test maneuver.

20. The non-transitory computer-readable medium of claim 18, wherein the instructions are further executable by the one or more processors to cause the processors to, during the flight test operation of the aircraft, generate or update a model associated with the aircraft based on the quantitative flight test data.

* * * * *